(12) United States Patent
Vitsnudel et al.

(10) Patent No.: US 8,497,927 B2
(45) Date of Patent: Jul. 30, 2013

(54) METHOD FOR USING WIDE DYNAMIC RANGE SENSOR IN LOW LIGHT CONDITIONS

(75) Inventors: Ilya Vitsnudel, Even Yehuda (IL); Noam Sorek, Zichron Yaacov (IL)

(73) Assignee: Broadcom Corporation, Irvine, CA (US)

( * ) Notice: Subject to any disclaimer, the term of this patent is extended or adjusted under 35 U.S.C. 154(b) by 855 days.

(21) Appl. No.: 11/174,196

(22) Filed: Jun. 30, 2005

(65) Prior Publication Data

US 2006/0023099 A1 Feb. 2, 2006

Related U.S. Application Data

(60) Provisional application No. 60/584,265, filed on Jul. 1, 2004, provisional application No. 60/587,034, filed on Jul. 13, 2004, provisional application No. 60/587,270, filed on Jul. 13, 2004.

(51) Int. Cl.
*H04N 3/14* (2006.01)
*H04N 5/335* (2006.01)

(52) U.S. Cl.
USPC .......................................................... 348/297

(58) Field of Classification Search
USPC ............. 348/221.1, 362, 248, 302, 320, 324, 348/297, 322, 317, 303, 304, 312
See application file for complete search history.

(56) References Cited

U.S. PATENT DOCUMENTS

| | | | | | |
|---|---|---|---|---|---|
| 4,704,633 | A | * | 11/1987 | Matsumoto | 348/255 |
| 5,051,832 | A | * | 9/1991 | Losee et al. | 348/220.1 |
| 5,353,057 | A | * | 10/1994 | Watanabe | 348/322 |
| 5,455,621 | A | * | 10/1995 | Morimura | 348/229.1 |
| 6,180,935 | B1 | * | 1/2001 | Hoagland | 250/208.1 |
| 6,222,589 | B1 | * | 4/2001 | Faroudja et al. | 348/448 |
| 6,441,845 | B1 | * | 8/2002 | Matsumoto | 348/65 |
| 6,583,818 | B1 | * | 6/2003 | Toma | 348/312 |
| 6,744,471 | B1 | * | 6/2004 | Kakinuma et al. | 348/371 |
| 6,831,692 | B1 | * | 12/2004 | Oda | 348/315 |
| 6,903,770 | B1 | * | 6/2005 | Kobayashi et al. | 348/296 |
| 6,952,234 | B2 | * | 10/2005 | Hatano | 348/363 |
| 7,379,620 | B2 | * | 5/2008 | Kobayashi | 382/284 |
| 2001/0001245 | A1 | * | 5/2001 | Kamishima et al. | 348/229 |
| 2002/0141002 | A1 | * | 10/2002 | Takano et al. | 358/513 |
| 2002/0145674 | A1 | * | 10/2002 | Nakamura | 348/296 |
| 2003/0067550 | A1 | * | 4/2003 | Inokuma et al. | 348/322 |
| 2004/0136603 | A1 | | 7/2004 | Vitsnudel et al. | |
| 2005/0099509 | A1 | * | 5/2005 | Kobayashi | 348/229.1 |

* cited by examiner

*Primary Examiner* — Roberto Velez
*Assistant Examiner* — Gary C Vieaux
(74) *Attorney, Agent, or Firm* — Brinks Hofer Gilson & Lione

(57) ABSTRACT

A method of operating an imaging system comprising an imaging sensor and a processing system, the processing system having an operating frequency and the sensor having a nominal sampling rate. The method comprises using the imaging sensor with a new sampling rate that is different that the nominal sampling rate.

12 Claims, 13 Drawing Sheets
(8 of 13 Drawing Sheet(s) Filed in Color)

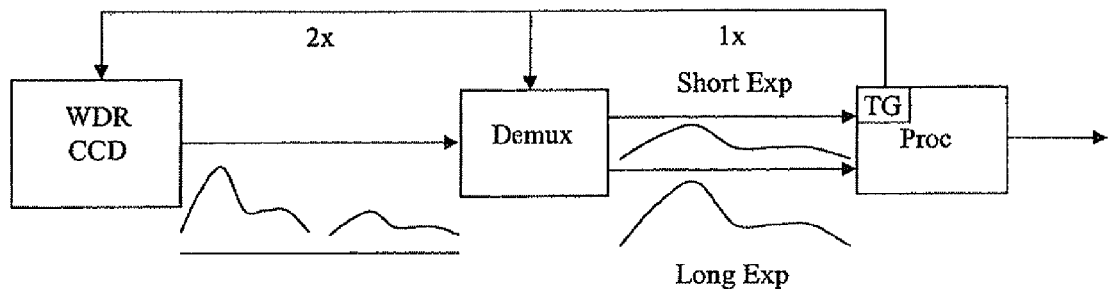
PRIOR ART
Fig. 1
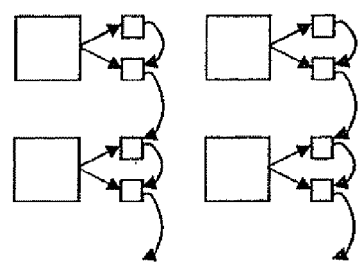
PRIOR ART        Fig. 2
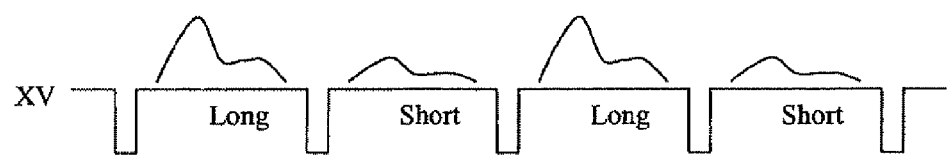
PRIOR ART        Fig. 3

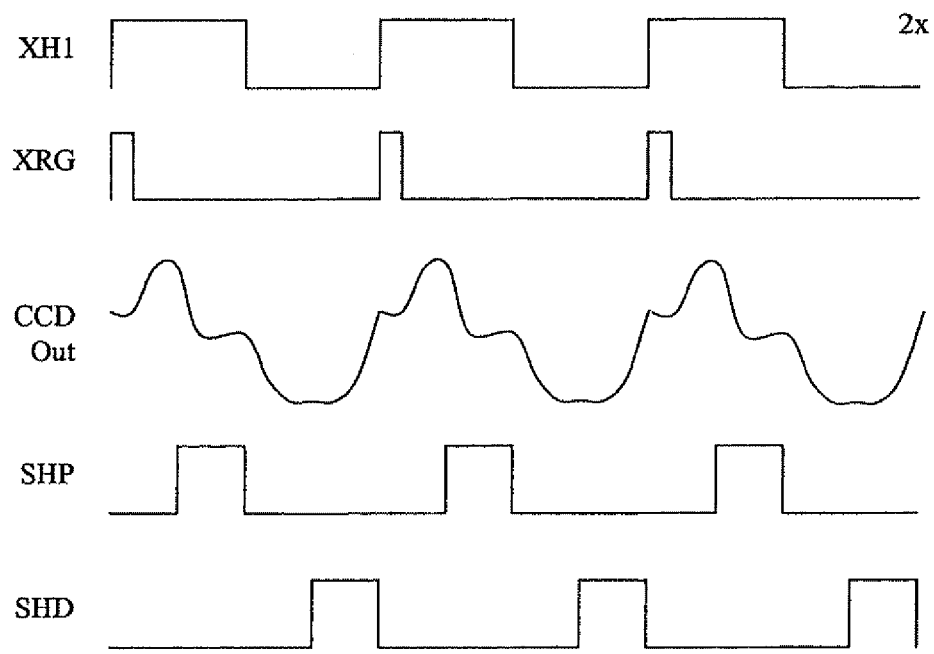
PRIOR ART  Fig. 4
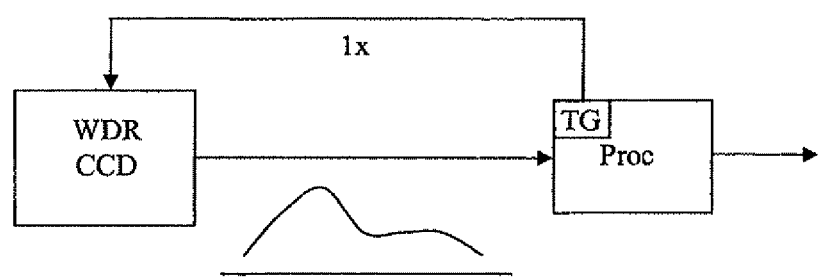
Fig. 5

METHOD FOR USING WIDE DYNAMIC RANGE SENSOR IN LOW LIGHT CONDITIONS

The present application claims the priority benefit of US 60/584,265, filed Jul. 1, 2004, of US 60/587,034, filed Jul. 13, 2004, and of U.S. Pat. No. 60/587,270, filed Jul. 13, 2004, all of which are incorporated by reference.

FIELD OF THE INVENTION

The present invention relates to enhanced digital imaging. More particularly it relates to improving the sampling of the imaging sensors in general and in particular the wide dynamic range sensors to obtain better sensitivity or using a regular sensor to obtain a sensor with wide dynamic range properties, generating non-interlaced images from wide dynamic range sensor, partly removing the smear effect and color image sensitivity enhancement by removing IR cut filter.

BACKGROUND OF THE INVENTION

Wide dynamic range (WDR) sensors are used when it is anticipated that the images would comprise details from both low-light scenes and very bright scenes.

Recently new techniques were introduced where the imaging sensor is used to acquire two consecutive images of a badly lit scene, one taken under short exposure conditions whereas the other taken under long exposure conditions. Using image analysis and processing techniques the two images are combined to produce an image with enhanced details.

For example, in US 20040136603 (Vitsnudel et al.), there is disclosed a method for enhancing wide dynamic range in images. The method comprises: acquiring at least two images of a scene to be imaged, the images acquired using different exposure times; constructing for a first image an illumination mask comprising a set of two weight values distinctively identifying respective areas of pixels of high or low illumination, over-exposed or underexposed with respect to a predetermined threshold illumination value, assigning one of the values to each pixels in them, whereas the other value is assigned to other pixels of the other images; using a low-pass filter to smooth border zones between pixels of one value and pixels of the other value, thus assigning weight values in a range between the two weight values; constructing a combined image using image data of pixels of the first image and image data of pixels of the other images proportional to the weight values assigned to each pixel using the illumination mask.

The use of this technique became popular and several imaging sensors commercially available form leading manufacturers are now equipped with the ability to take two sequential exposures—a short one and a long one). These sensors are referred to as WDR sensors, in the context of the present invention, as opposed to "regular" sensors, that sample a single image.

The present invention aims at providing an enhancement of the sensitivity and the robustness of the sampling of WDR sensor in low-light situations where there is no need for short exposure. It is suggested that the high frequency (e.g. 2×—double rate) clock is replaced by low frequency (e.g. 1×—basic rate) clock sampling and processing. By reverting to 1× clock a single long channel is more robustly sampled (sampling duty cycle is increased and exact sampling location is not required) and the noise is reduced.

Alternatively, it is suggested to increase the operating frequency of a regular sensor to get a couple (or more) of images (during one field period of time) that represent different exposures (short and long in the case of two images) of the same scene. It is suggested that the low frequency (e.g. 1×—basic rate) clock is replaced by high frequency (e.g. 2×—double rate) clock sampling, then the images are stored in the memory and subsequently WDR processing is made at the basic rate of 1×. In this case regular sensor might be utilized to handle WDR scenarios.

It is further suggested to separate in a temporal order between the sampling of the CCD and the rest of the imaging system operation. Accordingly, in low-light situations where only one channel is active sampling is done during the first half of the video line, acquired data is stored in a temporary buffer and then processing is performed during the second half of the video line. Thus full decoupling between the sampling and processing is achieved in order to eliminate system noises during the sampling.

Furthermore it is suggested to choose proper sampling times when using a higher frequency clock for additional components in the imaging system, for example memories (e.g. SDRAM). By using high frequency (e.g. 8×) clock and picking a proper subset of smaller number of pulses, which do not intervene with basic (e.g. transitions of 1×) clock sampling it is possible to further decrease the synchronous noise, especially vertical stripes that affect the processed video image.

BRIEF DESCRIPTION OF THE INVENTION

There is thus provided, in accordance with some preferred embodiments of the present invention, a method of operating an imaging system comprising an imaging sensor and a processing system, the processing system having an operating frequency and the sensor having a nominal sampling rate, the method comprising:

using the imaging sensor with a new sampling rate that is different than the nominal sampling rate.

Furthermore, in accordance with some preferred embodiments of the present invention, the method is used for enhancing imaging in low light conditions, wherein the imaging sensor comprises a wide dynamic range imaging sensor with a fast nominal sampling rate, and wherein the new sampling rate is slower than the nominal sampling rate.

Furthermore, in accordance with some preferred embodiments of the present invention, the new sampling rate is substantially half of the nominal sampling rate.

Furthermore, in accordance with some preferred embodiments of the present invention, the new sampling rate matches the operating frequency of the processing system.

Furthermore, in accordance with some preferred embodiments of the present invention, the new sampling rate is faster than the nominal sampling rate.

Furthermore, in accordance with some preferred embodiments of the present invention, the new sampling rate is substantially twice the nominal sampling rate, facilitating use of the imaging sensor as a wide dynamic range imaging sensor.

Furthermore, in accordance with some preferred embodiments of the present invention, the imaging sensor is a wide dynamic range imaging sensor with a sampling rate for acquiring two consecutive images, one image in short exposure and second image in long exposure, the sensor divided into lines, which are read in an interlaced manner by vertical shift registers whose number equals that of the lines, the method comprising:

reading sensor information from each line separately in a non-interlaced manner into corresponding vertical registers usually available for long and short exposures;

transferring the sensor information to the processing system; and adding line information in an interlaced manner to obtain an image free of motion artifacts and converting it to a non-interlaced format.

Furthermore, in accordance with some preferred embodiments of the present invention, there is provided a device for enhancing performance of an imaging system comprising an imaging sensor and a processing system, the processing system having an operating frequency and the sensor having a nominal sampling rate, the device comprising:

a timing generator that forces the imaging sensor to operate with a new sampling rate that is different than the nominal sampling rate.

Furthermore, in accordance with some preferred embodiments of the present invention, there is provided a method for enhancing imaging comprising:

separating in temporal order between sampling of the imaging sensor and other system operations.

Furthermore, in accordance with some preferred embodiments of the present invention, the method comprises increasing frequency rate of components of the imaging system other than the imaging sensor, and selecting proper sampling times that do not intervene with the imaging sensor sampling.

Furthermore, in accordance with some preferred embodiments of the present invention, the components comprise memories.

Furthermore, in accordance with some preferred embodiments of the present invention, there is provided a method for enhancing imaging in using an imaging system having a processing system and a wide dynamic range imaging sensor with a sampling rate for acquiring two consecutive images, one image in short exposure and second image in long exposure, the sensor divided into in lines divided into lines, which are read in an interlaced manner by vertical shift registers, the method comprising:

reading sensor information from each line separately into corresponding vertical registers usually available for long and short exposures;

transferring the sensor information to the processing system; and adding line information to obtain a an interlaced image free of motion artifacts.

Furthermore, in accordance with some preferred embodiments of the present invention, there is provided a method for improving color rendition of an imaging sensor in the process of acquiring an image, the method comprising:

reducing IR filtering, and reconstructing colors of the image by utilizing chrominance information from different mosaic elements.

Furthermore, in accordance with some preferred embodiments of the present invention, IR filter is removed.

Furthermore, in accordance with some preferred embodiments of the present invention, the method comprises:

normalizing chrominance components by luminance;

performing white balance decisions or white balance correction on the normalized components;

performing white balance correction on the normalized components or normalizing the corrected components.

Furthermore, in accordance with some preferred embodiments of the present invention, there is provided a method for partly resolving smear caused when reading-data from an imaging sensor, the method comprising issuing extra vertical transfer pulses that clean vertical shift registers cells that have been contaminated by erroneous charges induced by strong light sources.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention. Like components are denoted by like reference numerals.

The patent or application file contains at least one drawing executed in color. Copies of this patent or patent application publication with color drawings will be provided by the Office upon request and payment of the necessary fee.

FIG. 1 schematically illustrates a method and the system for sampling of a WDR imaging sensor, where the operation of a CCD (or CMOS) chip at double speed (2×), while subsequent processing is done at a normal speed (1×)—prior art.

FIG. 2 is a schematic illustration of the vertical read-out operation of a WDR CCD chip according to prior art sampling method.

FIG. 3 illustrates the nominal timing of vertical transfer in the WDR CCD according to prior art sampling method.

FIG. 4 illustrates the nominal timing of horizontal transfer in the CCD according to prior art sampling method, and associated pulses (CCD out, XH1, XRG, SHP and SHD).

FIG. 5 schematically illustrates a method and the system for robust sampling of the WDR CCD sensor according to a preferred embodiment of the present invention, where the operation of CCD (or CMOS) sensor and the subsequent processing is done at normal speed (1×).

DETAILED DESCRIPTION OF PREFERRED EMBODIMENTS

Figure 6:
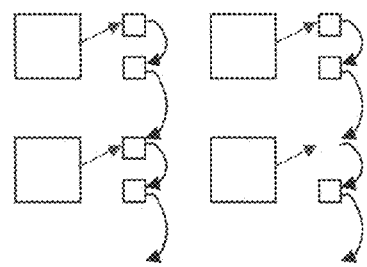
FIG. 6 is a schematic illustration of the vertical read-out operation of a WDR CCD chip according to a preferred embodiment of the present invention, to achieve 1× robust sampling.

Recently, a new brand of imaging sensors has been introduced to handle situations with broadly varying lighting conditions. These sensors operate at double rate, taking two sequential images with double exposure. One exposure, referred to as "long exposure", is aimed at successfully acquiring image data from parts where the illumination ("dark sections") is low and the other exposure, referred to as "short exposure", is aimed at successfully accounting for the vastly illuminated parts of the image. The resultant combined image, thus represents trustfully the whole scene without lose of any details.

FIG. 1 schematically illustrates a method for enhanced sampling of an imaging sensor according to a preferred embodiment of the present invention, where the operation of a CCD (or CMOS) chip is done at double speed (2×), while subsequent processing is done at a normal speed (1×)—prior art. The actual timing for sensor and system operation is determined with the TG block present in the system.

The WDR imaging sensor (CCD or CMOS) is operated at a 2× frequency clock (acquiring long and short exposure shots, while the subsequent processing is done at 1× clock). This is the nominal sampling rate (the suggested sampling rate). The operation mode of the CCD itself is illustrated in FIG. 2. Big rectangles represent CCD cells, small rectangles represent vertical shift registers, up-pointing arrows from the CCD cells designate charge flow initiated by XSG signals for reading the long exposure, down-pointing arrows from the CCD cells designate charge flow initiated by XSG signals for reading the short exposure. Arrows between vertical shift registers designate XV signals for vertical shift register transfer.

The nominal timing for the CCD vertical transfer is initiated by the XV signals illustrated in FIG. 3, where the vertical transfer is done intermittently between long and short exposure data. Here XV signal represents a vertical transfer signal of the CCD.

The nominal timing for the horizontal transfer is shown in FIG. 4. Here XH1 and XRG are the signals responsible for the horizontal transfer of the CCD information and the SHP and SHD are sample and hold signals in the CDS (Correlated Double Sampling) device that samples CCD data. From these figures it can be appreciated that the timing of the CCD output sampling signals SHP and SHD (in the CDS—Correlated Double Sampling device) is critical and is very sensitive to their locations relative to the XH1 and XRG sampling signals of the CCD. Small deviations in sampling times will cause incorporation of unrelated information into the output signal and the resultant image will appear noisy and patterned. Moreover, since the sampling is done on 2× clock and the system operates on 1× clock, there will be a difference between sequential mosaic components and given that the color is produced based on this difference the resultant image will have strong color tint in low-light conditions (usually observable as bluish or orange shade over the whole image).

In order to eliminate these imparities and taking in to account that in the low-light situations only one channel is actually bears the video information it is proposed to reduce the sampling rate to 1× clock. This reduction enables less critical sampling and more robust sampling (not affected by the possible clock jitter) and does not suffer from the above described color tint phenomenon, stemming from the difference between sequential mosaic components. FIG. 5 shows the corresponding schematics for 1× based system. In order to implement 1× clock sampling the following change to the sampling system is suggested. (The change is related to the different operation of the timing generator and demultiplexor unit in the DSP): The reading from the CCD cells (see FIG. 6) is made only from the long channel (effectively enabling even slightly longer integration time, since charges might be also accumulated during the short exposure). However, since the vertical shift register in the wide dynamic range sensor has double number of cells the vertical XV timing signals are changed to have dual pulses at the beginning of the line, practically causing the charges to skip the short cells during the vertical charge transfer from line to line. Also the pulse in the middle of XV is deleted disabling the reading of the short channel.

Figure 7:
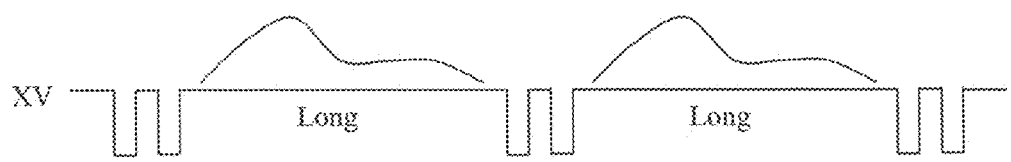
FIG. 7 illustrates the nominal timing of vertical transfer in the WDR CCD according to a preferred embodiment of the present invention, to achieve 1× robust sampling.

The new suggested vertical transfer timing, according to a preferred embodiment of the present invention is shown in the FIG. 7. A skip pulse relating to the skip over short-exposure cells, and then a pulse relating to charge transfer of the long exposure data.

It may be easily seen (in FIG. 8) that the location of SHP and SHD pulses (these are the signals that are used for sampling CDS—Correlated Double Sampling device) in the novel scheme does not need to be very precise since the active portions of the CCD signal now spread over longer periods of time. Moreover, by widening the SHP and SHD pulses properly even more robust signal might be acquired.). Please note that since the signal is sampled at low rate the exact timing of the SHP and SHD signals is not so critical and their duty cycle may actually be increased. (Compare with FIG. 4).

Figure 9:
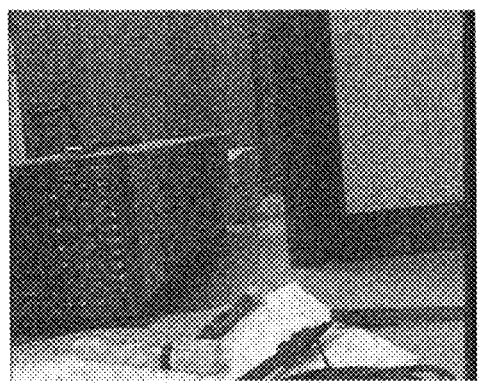
Figure 10:
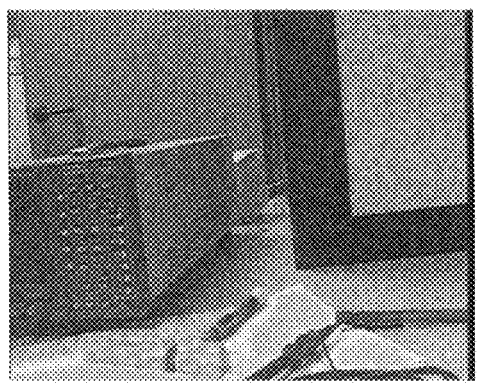
FIG. 10 is an image taken with an imaging sensor operated at 1× clock in same low light conditions (as in FIG. 9).

FIGS. 9 and 10 show the resultant images that are obtained by using 1× vs. 2× clock sampling in low light situations (with high gain).

FIG. 9 is an image taken with an imaging sensor sampling two shots (long and short) and combining the images, in low light conditions.

Figure 8:
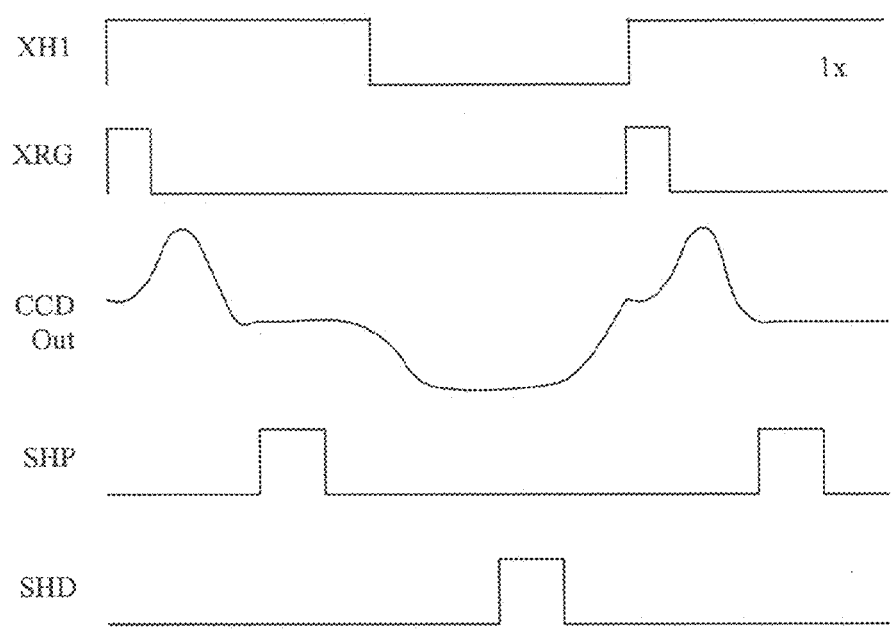
FIG. 8 illustrates the proposed timing of horizontal transfer in the WDR CCD according to a preferred embodiment of the present invention, and associated pulses (CCD out, XH1, XRG, SHP and SHD FIG. 9 is an image taken with an imaging sensor operated at 2× clock in low light conditions.

FIG. 10 is an image taken with an imaging sensor sampling one shot using only the long exposure channel data, in same low light conditions (as in FIG. 8).

Figure 11:
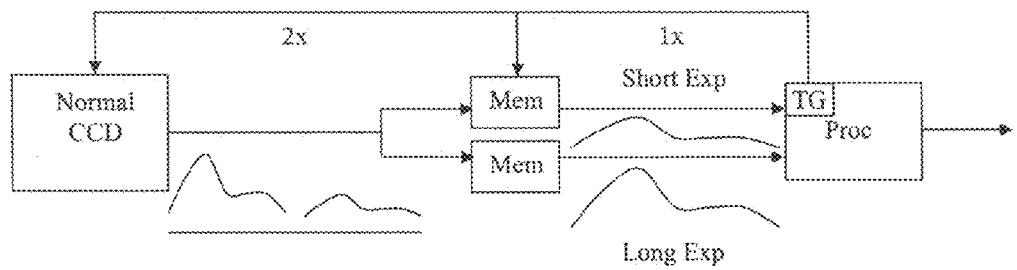
FIG. 11 schematically illustrates the operation of a normal sensor at 2× mode to produce a wide-dynamic range (WDR) image in accordance with a preferred embodiment of the present invention.
Figure 20:
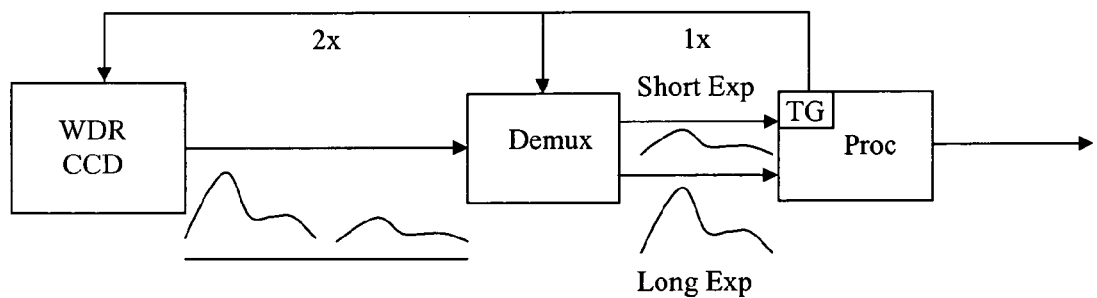
FIG. 20 schematically illustrates standard operation of a wide-dynamic range (WDR) imaging system (prior art).

The timing of the imaging sensor is governed by a timing generator (see FIGS. 1, 11 and 20).

It is noted, as a side remark, that using an imaging sensor with a sampling rate that matches the frequency of the processing system of the imaging system potentially eliminates "ghost" artifacts in the reconstructed image.

The present invention is not limited to imaging sensors with sampling rate that is twice the frequency of the processing system of the imaging system, or twice the sampling rate of a sensor. The present invention may in fact be described as using an imaging sensor with a nominal sampling rate (which is the sampling rate it is initially designed to work with) and operating the sensor with a new sampling rate that is different than the nominal sampling rate.

Similarly it is possible to increase the sampling rate of the imaging sensor. This may be practical, for example, when wishing to use a normal imaging sensor in wide dynamic range applications. In that case the sensor, which is initially intended to be used for acquiring a single image, and increasing its sampling rate to acquire two (or more) consecutive images of the same scene (with different exposure times) and processing the two (or more) images to obtain a single enhanced image (see, for example US 2004/0136603 (Vitsnudel et al.)).

Figure 12:
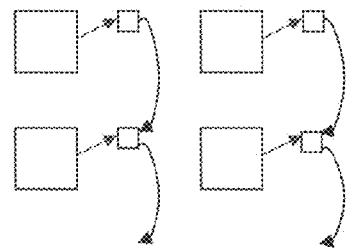
FIG. 12 illustrates read-out of the data from the normal sensor at 2× to simulate WDR CCD operation in accordance with a preferred embodiment of the present invention.
Figure 13:
FIG. 13 illustrates a novel timing scheme for getting WDR images from the normal sensor in accordance with a preferred embodiment of the present invention.

Alternatively, a regular sensor can be utilized for producing WDR images by increasing the frequency of the image acquisition part of the system. It is suggested to increase the operating frequency of the regular sensor to get a couple (or more) of images (during the field period of time) that represent different exposures (short and long in the case of two images) of the same scene. It is suggested that the low frequency (e.g. 1×—basic rate) clock is replaced by high frequency (e.g. 2×—double rate) clock sampling, then images are stored in the memory and subsequently WDR processing is made at the basic rate of 1×, as shown in FIG. 11. FIG. 12 shows that except for the doubling of the rate the sensor is operated normally, and fields are read-out as in regular sensor operation. FIG. 13 shows that the field with long exposure is read first followed by the field with short exposure.

It is further suggested to separate between the sampling scheme and the processing operation of the entire imaging system. More specifically it is proposed to separate in temporal order between the sampling of the CCD and the system operation. In low-light situations where only one channel is active the sampling may be done during the first half of the video line and the data is stored in temporary buffer. Then the processing is made during the second half of the video line.

Separating (in timely manner) between sampling and processing system operation enables quiet (noise-less) acquisition of CCD data since almost no digital operation is performed during the sampling and the noise that originates from digital system and usually affects the sampling is not passed through the power and ground lines.

Figure 14:
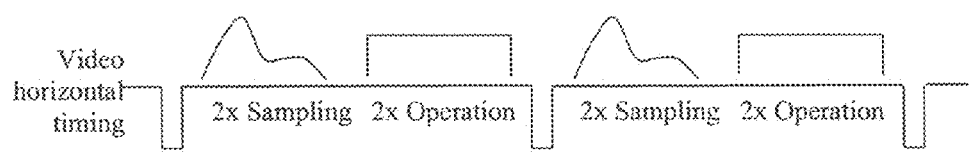
FIG. 14 is a schematic illustration of a video line timing scheme to separate (in timely manner) between the CCD and the rest of the system operation according to an additional preferred embodiment of the present invention

The video line timing is illustrated in FIG. 14. Here, only the long channel is sampled while the rest of the system is halted. The system is restarted during the short channel acquisition time during which the sensor sampling is stopped. The sampling step is separated from and followed by the processing step. Thus full decoupling between the sampling and processing is achieved and eliminates system noises during the sampling.

High Frequency DSP and External Peripherals Operation are now considered. To achieve better performance in low-light situations, the imaging system utilizes memories for temporal filtering of the CCD data. Memories also could be used for additional purposes in the system such as freeze, zoom, flip, filtering and so on. Usually, these chips are operated at higher frequency than the basic operating clock because several operations need to be performed for the specific pixel during one system clock. This high rate, coupled with the fact that the memory resides outside the chip and thus requires fast driving (strong currents) causes injection of the noises into power and ground lines, which in turn affect the sampling.

Figure 15:
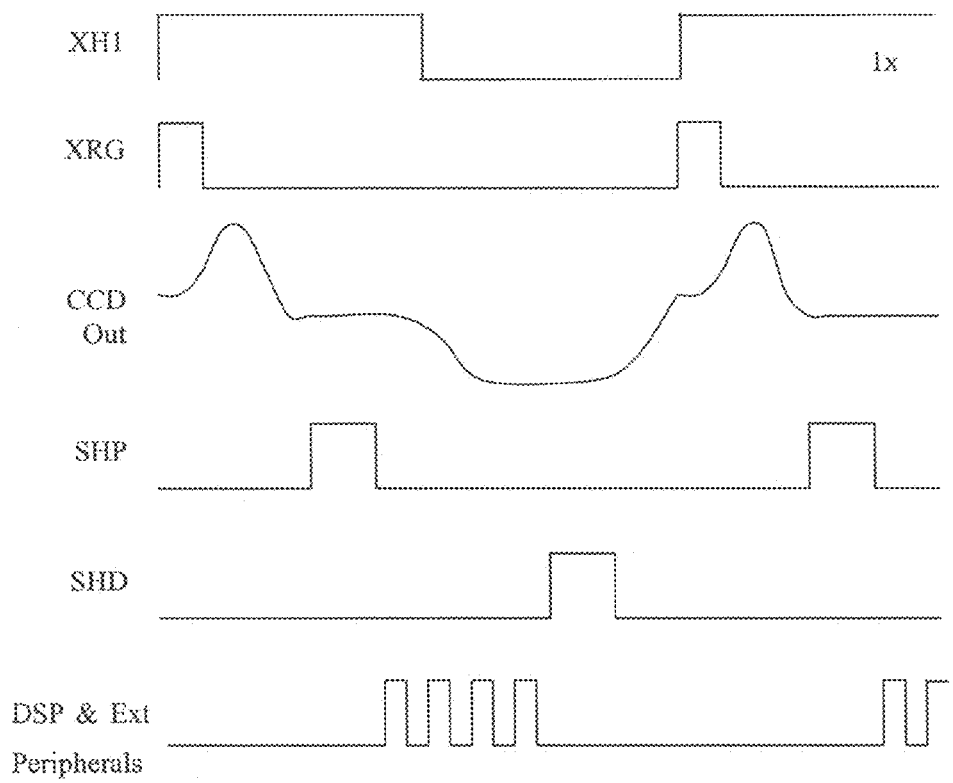
FIG. 15 is a schematic illustration of video horizontal timing sampling (and associated pulses) scheme according to another preferred embodiment of the present invention, for use with higher frequency DSP or external peripherals.

Ii is proposed here to use high frequency (e.g. 8×) clock and pick a proper subset of smaller number of pulses, which do not intervene with basic (e.g. 1×) clock sampling, to further decrease the synchronous noise, especially vertical stripes that affect the processed video image. The horizontal timing corresponding to this case (assuming the operation is done at 1× clock) is shown in the FIG. 15. The memory sampling signals have been inserted in between the CCD samplings in uniform manner for all 1× clocks, so as to ensure proper separation and prevention of noise effects.

Figure 16:
FIG. 16 is a grabbed image with undesired thin synchronous stripe pattern attributed to high-frequency operation (higher than that of the rest of the system) of memory components of a video system, the image acquired in low-light conditions and with high gain.
Figure 17:
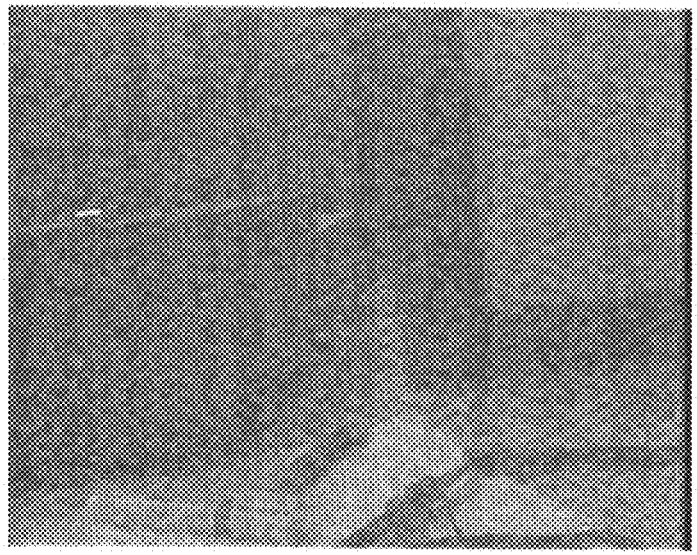
FIG. 17 is a grabbed image with undesired color stripe pattern attributed to high-frequency operation (quadruple frequency) of memory components of a video system, the image acquired in low-light conditions and with high gain.
Figure 18:
FIG. 18 is a grabbed image with the memories operated at their nominally required rate (4× frequency) with four samples selected from the high-frequency (8× frequency) clock with 8 samples, the image acquired in low-light conditions and with high gain.

There are problems associated with higher sampling of the memory components in the video system in low-light situation with high gain. In the image shown in FIG. 16 thin synchronous vertical stripes are apparent and in the image shown in FIG. 17 synchronous vertical color stripes are present. These correspond to write/read bursts to the memory. The image depicted in FIG. 18 displays the image with memories operated in the 8× mode in accordance with a preferred embodiment of the present invention with four clock cycles inserted in between the samplings in a uniform manner. It is easily seen that such approach substantially resolves the vertical stripes problem.

Another aspect of the present invention relates to the nature of imaging sensor itself.

The present invention suggests a way to utilize wide dynamic range CCD sensor for generating high-resolution non-interlace video signal. By varying timing signals the CCD is read without internal lines addition to produce fields. The information is stored in the external field memory for subsequent addition, in an accompanying processor, producing either standard interlaced or non-interlaced video (optionally at the will and choice of the user, or as two optional factory settings). The biggest advantage of the proposed method is that the sensor may be utilized both in standard video applications as well as be used directly in MPEG compression in the natural frame mode completely eliminating motion artifacts.

Figure 19:
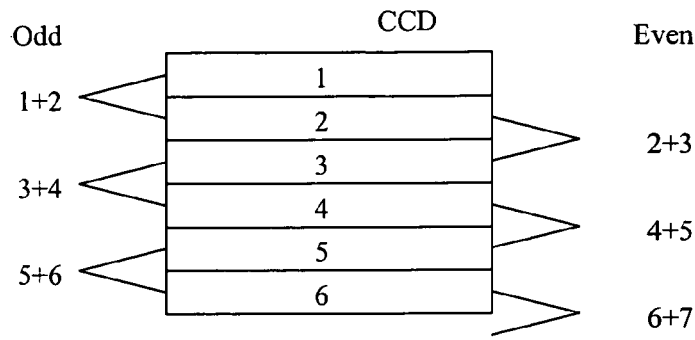
FIG. 19 illustrates generation of interlaced video image on a CCD (prior art).

Using a standard timing generator of signals the imaging sensor produces an interlaced video image comprising of two sequential fields. Interlaced image is obtained by reading the sensor (adding charges) in slightly different timing sequences for even and odd fields (see FIG. 19).

Usually, there are two signals that are responsible for charge transfer from CCD to the vertical shift registers: XSG1 & XSG2. These signals determine the way in which even and odd fields are produced. In regular CCD (not WDR) there is only half a number of vertical shift registers and therefore during the field time only half of the total CCD lines are obtained in the output. In a WDR CCD the number of vertical shift registers is doubled and equal to the total number of lines available in the CCD. However since these registers are used for long and short channels it leads effectively to half output image resolution (interlaced image with internal line addition in the CCD).

Figure 21:
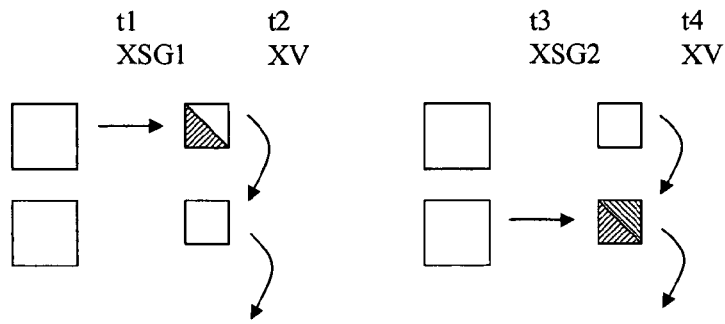
FIG. 21 illustrates standard WDR CCD operation (prior art).

The present invention suggests an alternative use of the fact that there is a double number of vertical shift registers available in the WDR CCD, to increase the output resolution and convert the resultant image to non-interlaced format, in cases where there is no need to cover wide dynamic range of illuminations. The standard operation of the WDR sensor is illustrated in FIG. 20, and the CCD operation is shown in FIG. 21, to be as follows:

At time t1, XSG1 signal is issued and the charges from the odd CCD lines are read into proper vertical registers. Then at time t2, XV pulses shift the charges down the vertical shift registers and then at time t3 the charges accumulated in the even vertical CCD lines are added (by XSG2 signals) to produce output for a specific field. Later additional XV pulses (at time t4 and on) transfer the charges into horizontal shift registers.

Figure 22:
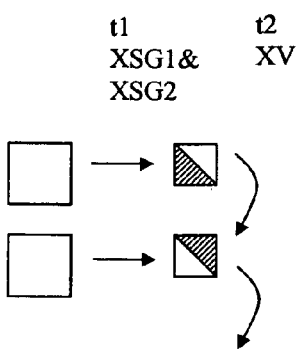
FIG. 22 illustrates a novel timing scheme for a WDR CCD in accordance with a preferred embodiment of the present invention.
Figure 23:
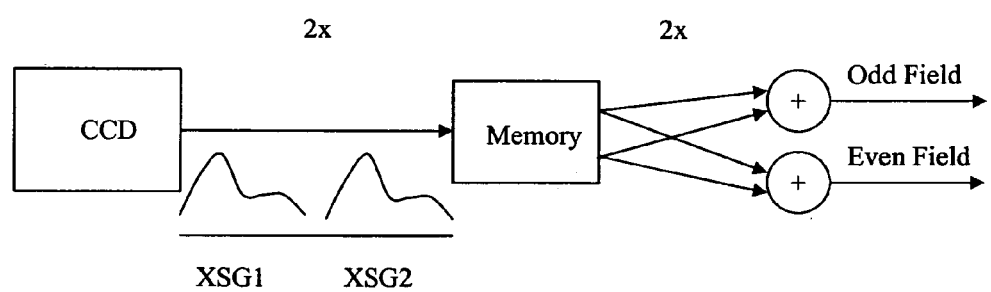
FIG. 23 is a novel operation scheme for a WDR imaging system in accordance with a preferred embodiment of the present invention.

According to the present invention the proposed CCD timing is changed in a manner depicted in FIG. 22. XSG1 & XSG2 signals are issued simultaneously and the respective charges from the sequential CCD lines are read into sequential vertical registers, without addition (that is featured in common interlaced video timing). After the CCD discharges the XV pulses move the charges down the vertical registers into the horizontal register. The resultant operation of the imaging system with respect to timing is depicted in FIG. 23.

The CCD output is stored in the memory and then the processor adds lines externally.

As with the conventional CCD operation, sequential fields (required for the normal video output) are produced in the following order: for odd fields: 1+2, 3+4, 5+6 and so on and for even fields: 1, 2+3, 4+5, 6+7 and so on. Thus an interlaced video is produced at the output, however, since the sensor is read out in non-interlace manner the output image is effectively frozen without any motion artifact problems that are so characteristic of interlaced video.

The memory for image storing should preferably be organized differently depending on the required output video.

In case where the output video should be compatible with standard video signal one field memory should be employed in the following way: as sequential lines come from the processor the odd filed lines are calculated and submitted to the processor, while the even lines are simultaneously calculated and stored in the field memory for the subsequent processing during the next field.

In case where the output video should have non-interlaced form there is no need for additional memories. The output is produced as the lines are obtained from the sensor in sequential manner.

There are a number of advantages in the proposed method: CCD sampling might be performed at normal clock rate (1×) as opposed to the double clock rate (2×) in the WDR mode. Such sampling facilitates a more robust signal acquisition improving overall system performance in terms of signal-to-noise ratio.

The sensitivity of the imaging system might be improved twice, since the integration time might be doubled, leading to the full rate video of 30 frames per second.

Wide dynamic range operation providing long and short channels might be done in the non-interlaced manner (within frame resolution) when using 2× rate clock sampling.

Seamless connection to the MPEG engine is possible with the suggested method of CCD operation, producing full frame image required in compression. The direct non-interlace input resolves all the problematic issues in MPEG regarding the conversion of interlace to non-interlace mode (field mode). The present invention can be implemented in conjunction with other types of image compression too.

Figure 24:
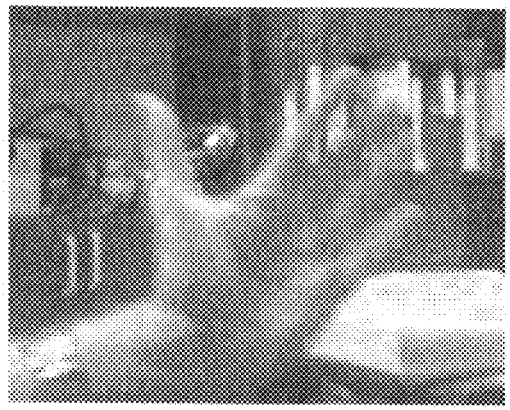
FIG. 24 is a grabbed image from a WDR imaging system in interlaced mode of operation (standard) to get a non-interlaced image.
Figure 25:
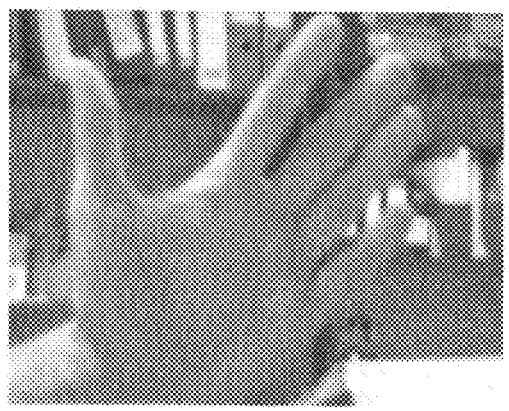
FIG. 25 is a grabbed image from a WDR imaging system in a non-interlaced mode of operation, as suggested in the present invention.

FIGS. 24 and 25 provide an example of the benefits of the proposed method of CCD operation. It might be seen that the image in FIG. 24 suffers from the motion artifacts clearly visible in the frozen interlaced frame. On the contrast, FIG. 25 shows a similar image, however acquired with the same CCD but operated in a proposed non-interlaced manner. It is seen that this image does not suffer from motion artifacts.

Yet another aspect of the present invention deals with the color sensitivity of the imaging sensor. To improve the color rendition of CCD and CMOS based video and still cameras an IR-Cut filter is usually used in situations where sufficient lighting is available. It is possible, in low-light scenarios to remove the IR-Cut filter in order to get better sensitivity. However, removing the filter is accompanied in the camera by switching to black and white mode of operation because colors are biased strongly toward the red tint. The present invention discloses a procedure in which the IR-Cut filter is removed and the colors are reconstructed by applying mathematical calculations.

Colors are produced in the CCD camera based on the measured sensor raw data. In some cameras a primary mosaic (RGB) is available, while others use sensors with complimentary mosaic (CyYeMgGr) arrangement. An additional filter is usually used to remove the IR portion of the incoming light flux.

In order to obtain accurate colors in the output image, cameras perform a process known as white balance, in which color generation operation is corrected to ensure that for white color red, green and blue output values are identical. If the sensor has a complimentary mosaic arrangement then the RGB reproduction will look as follows $$Dr = \{(Mg + Ye) - (G + Cy)\} = 2R_i - G_i \quad [1]$$

$$Db = \{(Mg + Cy) - (G + Ye)\} = 2B_i - G_i$$

$$Y = \{(G + Cy) + (Mg + Ye)\}/2 = B_i + 1.5G_i + R_i$$

$$\begin{bmatrix} R_o \\ G_o \\ B_o \end{bmatrix} = \begin{bmatrix} c_{11} & c_{12} & c_{13} \\ c_{21} & c_{22} & c_{23} \\ c_{31} & c_{32} & c_{33} \end{bmatrix} \begin{bmatrix} Y \\ Dr \\ Db \end{bmatrix}$$

Figure 26:
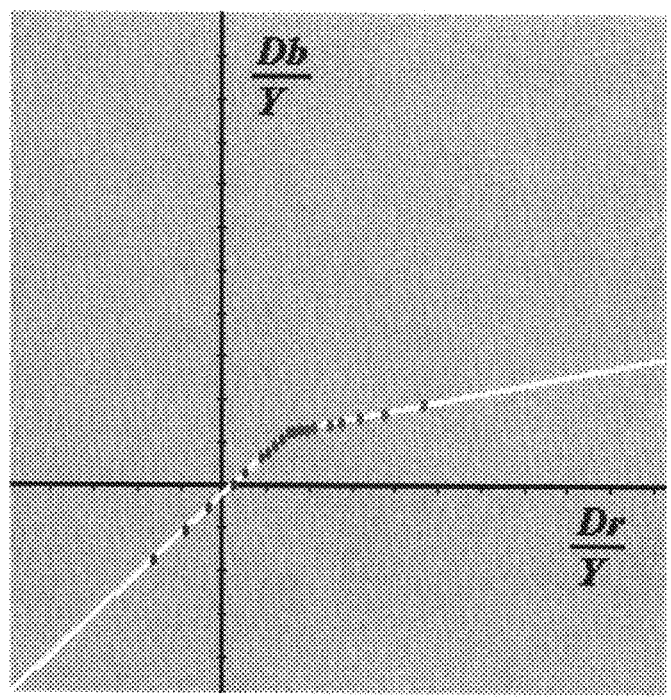
FIG. 26 is a graph illustrating the principles of the automatic white balance operation.

The coefficients $c_{11}$-$c_{33}$ are estimated not only to get $R_o=R_i$, $G_o=G_i$ and $B_o=B_i$ but also to produce $R_o=G_o=B_o$ for white incident color. In order to satisfy the last condition several different matrices for making a white balance are used according to different color illuminations. Specific matrix is chosen by the following procedure. Since Y, Dr and Db values are generated from the $R_i$, $G_i$, and $B_i$ values in a linear manner, the Dr and Db are normalized by Y to produce values that are supposed to be constant over various illumination levels for a given light source. Because of this normalization the light sources lie on the line as shown in the graph of FIG. 26. This plot represents different sources of illuminations and the closest source to the estimated white point is selected from these sources.

So the statistics required for white balance is measured based on Dr/Y and Db/Y values and the light source is found by detecting the closest point on the line to the Dr/Y and Db/Y.

To increase sensor sensitivity it is possible to remove the IR-Cut filter. Removal of the filter exposes the sensor to additional photons in the IR region. The graph in FIG. 27 illustrates this situation.

Figure 27:
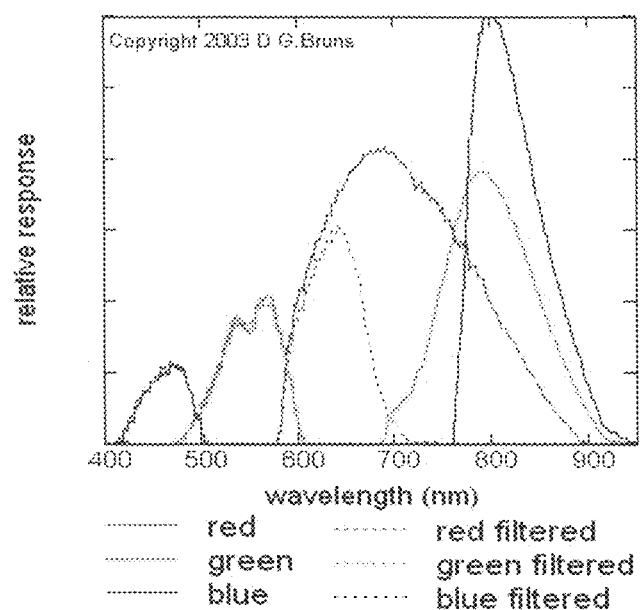
FIG. 27 is a graphic illustration of RGB responses of a typical imaging sensor, with and without filtering.

It can be appreciated from FIG. 27 that there is a strong sensor response beyond 700 nm wavelength. Because of this the output colors are distorted significantly and cameras that remove the IR-Cut filter consequently switch to the black and white mode of operation. In this mode only the luminance channel is active and its response greatly amplified.

In the present invention it is proposed to utilize the residual chrominance information available from various mosaic elements to reconstruct the colors when IR-Cut filter is removed.

It is evident that in the first approximation the IR portion of the spectrum introduces a significant shift to the colors that would have been measured with IR-Cut filter. However, since the Dr and Db signals represent basically the difference between mosaic elements, the offset introduced because of IR will be eliminated. Therefore, the colors will be affected by the offset in Y channel:

$$\begin{bmatrix} R'_o \\ G'_o \\ B'_o \end{bmatrix} = \begin{bmatrix} c_{11} & c_{12} & c_{13} \\ c_{21} & c_{22} & c_{23} \\ c_{31} & c_{32} & c_{33} \end{bmatrix} \begin{bmatrix} Y + Y' \\ Dr \\ Db \end{bmatrix}$$

The influence of the Y' addition is a decrement in the color saturation that may be easily adjusted by external tuning. Sometimes the IR response of the Red channel is bigger than the other components and a red tint will be present in the image. Then coefficients of the white balance matrix should be readjusted to eliminate this tint.

The following procedure is proposed for this purpose, according to a preferred embodiment of the present invention:

Point the camera to the reflective color chart and designate colors measurements on the vectorscope and waveform monitor for each color with IR-Cut filter on. These measurements will be used as a reference for the subsequent WB matrix calibration without IR-Cut filter. The RGB target values can be measured then by making an artificial colors and matching them to the real colors on the vectorscope and waveform monitors.

Switch the IR-Cut off and adjust the brightness to some nominal level. For each color stripe measure the Dr/Y, Db/Y and Y statistics.

Based on the measured statistics and target values estimate the resultant white balance matrix.

$$WBMtrx = RGB*YDrDb^T*(YDrDb*YDrDb^T)^{-1}$$

where RGB is the matrix containing target R, G, and B values and YDrDb is the matrix containing measured Y, Dr and Db values.

Figure 28:
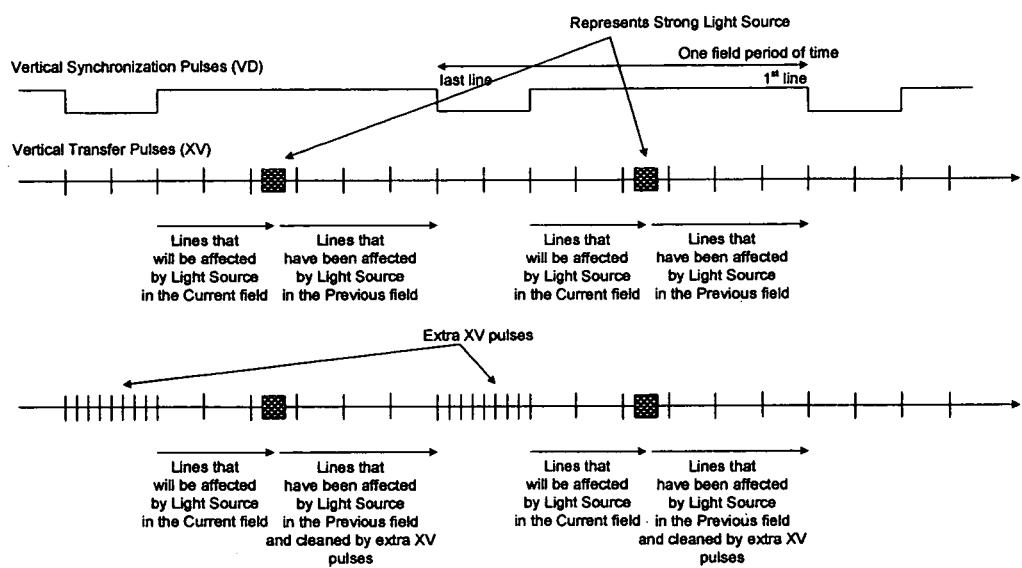
FIG. 28 is schematics that represent the principles of smear phenomenon generation in the imaging sensor. The upper part represents normal situation in which all sensor lines have been affected by smear. The bottom part reflects suggested correction in which extra vertical transfer pulses (XV) are issued during the vertical synchronization period in order to discharge the charges accumulated in vertical register cells by passing through the strong light sources.

Another aspect of the present invention deals with partial resolution of the smear phenomenon that happens when strong source of light is present in the scene. FIG. 28 is represents schematically the principles of smear phenomenon generation in the imaging sensor. The upper part of the drawing represents a normal situation in which all sensor lines have been affected by smear. The image field comprises of two parts. One part (image upper part) consists of lines that have been affected by the light source when charges were transferred vertically during the previous field. The other part (image bottom part) consists of lines that have been affected by the light source when charges are transferred vertically during the current field. The bottom part of the drawing reflects suggested correction in which extra vertical transfer pulses (XV) are issued during the vertical synchronization period in order to discharge the charges accumulated in vertical register cells. Thus the erroneous charges induced by the light source in the image bottom part are cleaned and the smear phenomenon in that part of the image is prevented.

Figure 29:
FIG. 29 is a grabbed image that shows smear phenomenon.
Figure 30:
FIG. 30 is a grabbed image that shows that smear phenomenon have been partially resolved by the proposed insertion of extra vertical transfer pulses (XV).

FIG. 29 is a grabbed image that shows smear phenomenon. FIG. 30 is a grabbed image that shows that smear phenomenon have been partially resolved by the proposed insertion of extra vertical transfer pulses (XV).

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method of operating an imaging system, the method comprising:
    operating an image sensor at a second sampling rate that is lower than a first sampling rate at which the image sensor was designed to operate;
    generating first and second vertical shift pulses for vertical transfer timing at a beginning of readout of image data corresponding to each line of pixels; and
    sampling the image data of each line of pixels at the second sampling rate, wherein the first and second vertical shift pulses are generated consecutively between a first readout of image data for a first line of pixels and a second readout of image data for a second line of pixels, where the first and second readouts are consecutive, wherein a skip pulse is generated based on the first vertical shift pulse, the skip pulse being generated between charge transfer pulses for long exposure data and having a shorter duration than the charge transfer pulses for the long exposure data.

2. The method of claim 1, wherein the second sampling rate matches an operating frequency of a processing system of the imaging system.

3. The method of claim 1, wherein the first sampling rate of the image sensor is configured to match an operating frequency of a processing system of an image system to reduce ghost artifacts in a reconstructed image.

4. The method of claim 1, wherein the second sampling rate of the image sensor enables less critical sampling and more robust sampling relative to if the image sensor operated at the first sampling rate.

5. The method of claim 1, wherein the second sampling rate of the image sensor causes the sampling to be less affected by clock jitter relative to if the image sensor operated at the first sampling rate.

6. The method of claim 1, wherein the skip pulse is generated based on a skip of the first vertical shift pulse over a short-exposure vertical shift register.

7. An imaging system comprising:

an imaging sensor;

a timing generator configured to generate first and second vertical shift pulses for vertical transfer timing at a beginning of readout of image data corresponding to each line of pixels, wherein the timing generator is configured to generate signals for sampling the image data of each line of pixels at a second sampling rate which is lower than a first sampling rate at which the imaging sensor was designed to operate, wherein the first and second vertical shift pulses are generated consecutively between a first readout of image data for a first line of pixels and a second readout of image data for a second line of pixels, where the first and second readouts are consecutive, wherein a skip pulse is generated based on the first vertical shift pulse, the skip pulse being generated between charge transfer pulses for long exposure data and having a shorter duration than the charge transfer pulses for the long exposure data.

8. The system of claim 7, wherein the second sampling rate matches an operating frequency of a processing system of the imaging system.

9. The system of claim 7, wherein the timing generator is configured to operate the imaging sensor at the first sampling rate which is configured to match an operating frequency of a processing system of the image system to reduce ghost artifacts in a reconstructed image.

10. The system of claim 7, wherein the imaging sensor comprises a first imaging sensor and a second imaging sensor that are vertically aligned, wherein the first imaging sensor is associated with a first vertical shift register and a second vertical shift register, wherein the second imaging sensor is associated with a third vertical shift register and a fourth vertical shift register, and wherein the vertical shift registers are vertically aligned.

11. The system of claim 10, wherein the first imaging sensor and the second imaging sensor are read out into the first vertical shift register and the third vertical shift register, respectively, wherein a first vertical shift register transfer corresponding to the first vertical shift pulse occurs from the first vertical shift register to the second vertical shift register and from the third vertical shift register to the fourth vertical shift register, and wherein a second vertical shift register transfer corresponding to the second vertical shift pulse occurs from the second vertical shift register to the third vertical shift register and out of the fourth vertical shift register.

12. The system of claim 7, wherein the skip pulse is generated based on a skip of the first vertical shift pulse over a short-exposure vertical shift register.

* * * * *